United States Patent [19]

Barnard

[11] Patent Number: 4,495,451
[45] Date of Patent: Jan. 22, 1985

[54] INERTIAL ENERGY INTERCHANGE SYSTEM WITH ENERGY MAKEUP BY COMBUSTION ENGINE ON DEMAND

[76] Inventor: Maxwell K. Barnard, 4700 Seventh Ave. NE., Seattle, Wash. 98105

[21] Appl. No.: 385,301

[22] Filed: Jun. 7, 1982

Related U.S. Application Data

[63] Continuation-in-part of Ser. No. 222,899, Jan. 6, 1981, abandoned.

[51] Int. Cl.³ .............................................. H02K 7/02
[52] U.S. Cl. .................................... 318/150; 318/161; 180/165; 180/65.4; 180/65.5
[58] Field of Search ................ 180/65 A, 65 C, 65 F, 180/165, 65.1, 65.2, 65.3, 65.6; 318/150, 161; 280/217

[56] References Cited

U.S. PATENT DOCUMENTS

| | | | |
|---|---|---|---|
| 2,443,770 | 6/1948 | Kasschau | 180/165 |
| 3,503,464 | 3/1970 | Yardney | 180/65.2 |
| 3,561,557 | 2/1971 | Magnuson et al. | 180/65.2 |
| 3,565,202 | 2/1971 | Evans et al. | 180/65.4 |
| 3,713,504 | 1/1973 | Shimer et al. | 180/65.4 |
| 3,719,881 | 3/1973 | Shibata et al. | 180/65.4 |
| 3,796,278 | 3/1974 | Shibata | 180/65.2 |
| 3,889,127 | 6/1975 | Shibata | 180/65.4 |
| 3,923,115 | 12/1975 | Helling | 290/45 X |
| 3,979,650 | 9/1976 | Jamison et al. | 318/150 |
| 4,034,273 | 7/1977 | Meek et al. | 318/149 |
| 4,065,702 | 12/1977 | Locker et al. | 318/161 |
| 4,099,589 | 7/1978 | Williams | 290/45 X |
| 4,119,861 | 10/1978 | Gocho | 180/65.4 |
| 4,126,200 | 11/1978 | Miller et al. | 180/165 |
| 4,179,729 | 12/1979 | Stanton et al. | 363/175 |
| 4,196,785 | 4/1980 | Downing, Jr. | 180/65.4 |
| 4,199,037 | 4/1980 | White | 180/65.4 |
| 4,309,620 | 1/1982 | Bock | 290/45 X |
| 4,346,773 | 8/1982 | Hofbauer et al. | 180/165 |
| 4,405,031 | 9/1983 | Rotter | 180/165 |
| 4,426,585 | 1/1984 | Bigalke | 318/700 X |

FOREIGN PATENT DOCUMENTS

| | | | |
|---|---|---|---|
| 8002263 | 10/1980 | European Pat. Off. | 180/165 |
| 2943554 | 5/1981 | Fed. Rep. of Germany | 180/165 |
| 2031822 | 4/1980 | United Kingdom | 180/165 |

OTHER PUBLICATIONS

Article Entitled "Flywheels" in Scientific American, vol. 229, No. 6, Issue of Dec. 1973, at pp. 17-23.

Primary Examiner—J. V. Truhe
Assistant Examiner—Bentsu Ro
Attorney, Agent, or Firm—Graybeal & Cullom

[57] ABSTRACT

Vehicle propulsion system or the like characterized by energy interchange between a plurality of flywheel assemblies each including a driving/driven induction motor/generator, and a plurality of vehicle drive wheel assemblies including drive wheels each directly driving/driven by an induction motor/generator, with energy makeup provided by a heat engine driven generator means, operated on demand, such energy interchange being by means of a multi-directional bus to which the flywheel and drive wheel motor/generators are selectively connected by variable frequency switch means and to which the engine driven generator is connected when operating, the switching being under control of a digital computer type controller, the controller receiving as inputs various vehicle operating conditions including flywheel, drive wheel, brake, steering angle and speed control positions, and bus voltage and heat engine driven generator operating condition, and the controller generating switch means controlling outputs causing energy transfer from or to the bus and to or from the drive wheel motor/generators to accelerate or decelerate the vehicle responsive to operator inputs, and causing energy transfer from or to the bus and to or from the flywheel motor/generators when the bus voltage is greater than or less than a predetermined value and to maintain the flywheels at substantially equal rotational speeds, and operating the heat engine and cause electrical energy transfer from the engine driven generator means to the bus whenever the total energy available from the motion of the vehicle and the kinetic energy of the flywheels is less than a predetermined value.

17 Claims, 11 Drawing Figures

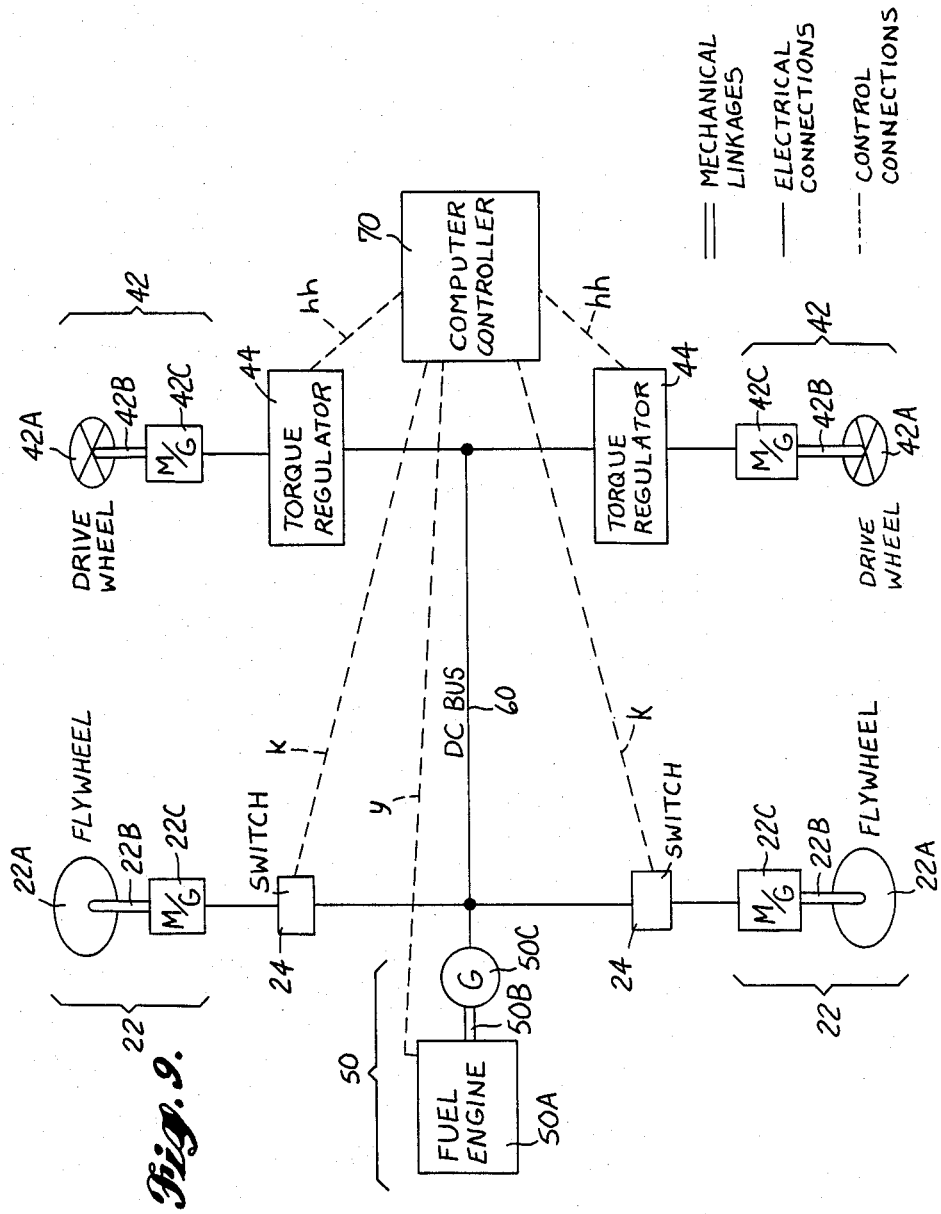

4,495,451

INERTIAL ENERGY INTERCHANGE SYSTEM WITH ENERGY MAKEUP BY COMBUSTION ENGINE ON DEMAND

CROSS REFERENCE TO RELATED APPLICATION

This application is a continuation-in-part of application Ser. No. 222,899, filed Jan. 6, 1981, entitled Transportation System, and now abandoned.

FIELD OF THE INVENTION

The present invention relates to efficient motive control of inertial devices, and more particularly to propulsion energy control apparatus for a self-propelled vehicle or the like, or for similar control of any variable speed energy consuming equipment.

BACKGROUND ART

Kinetic energy storage means for use on self-propelled vehicles are known in the art. For example, an article entitled "Flywheels" from the December 1973 *Scientific American* illustrates one energy storage means. The article discusses dual, counter-rotating coaxial flywheels and their applicability as energy storage devices for self-propelled vehicles. The article does not discuss any way to integrate the dual flywheels with the vehicle nor with the various electrical and mechanical systems carried on the vehicle.

Bock U.S. Pat. No. 4,309,620 discloses a vehicle propulsion system which is controlled by an analog type computing device and includes a so-called flywheel electric transmission (FLET) which comprises a single flywheel and clutch coupled motor/generator units, one of which is mechanically coupled at all times to a continuously operating heat engine, with the armatures of both units being carried by the flywheel. Bock also discloses an all-electric version of such a system in which the heat engine is replaced by a battery pack and the flywheel motor/generator units in the FLET are at all times mechanically coupled to each other and to a motor/generator unit mechanically coupled to the vehicle drive wheels. Operational control of vehicle speed in this system is by change in motor/generator unit excitation frequency rather than by bi-directional switching.

Stanton et al U.S. Pat. No. 4,179,729 discloses an electrical power conversion system involving bidirectional switch means and related circuitry as applied to flywheel energy storage systems and the like, and is of particular interest to the present invention from the point of view of its teaching as to the state of the art of converting electrical energy at a low or zero frequency (DC) to variable higher frequencies and vice versa.

The patent to Locker et al, U.S. Pat. No. 4,065,702, discloses a drive system for high inertia loads, such as a motor vehicle, including a flywheel. The drive system shown does not include the use of a means to replenish the vehicle energy losses with the electric drive means used to propel the vehicle. As a result, the vehicle in a short time no longer is self-propelled.

The present invention uses drive mechanisms in combination an intermittently operated auxiliary energy source, including a heat engine such as an internal combustion engine, to both propel the vehicle and to replenish vehicle energy losses, respectively. When combined with the disclosed energy storage means, the present invention provides a highly efficient, long range self-propelled vehicle.

SUMMARY OF THE INVENTION

According to one aspect of the present invention, an apparatus providing motive energy for a self-propelled vehicle comprises a first subsystem carried by the vehicle for absorbing, storing, and releasing energy. A second subsystem, also carried by the vehicle, is operable to convert the motion of the vehicle into storable energy and generated or stored energy into motion of the vehicle. An intermittently operated third subsystem carried by the vehicle is operable to supply energy losses in both the first and second subsystems. An electrical energy conductor is in communication with the first, second, and third subsystems and is operable through digital computer control to transfer energy in electrical form from the energy source and to and from the first and second subsystems as operating conditions dictate.

An object of the present invention is to provide a propulsion system for use on a self-propelled vehicle operable to conserve the vehicle's fuel, in that the fuel consuming engine is not mechanically connected (i.e. provides energy to the system only in electrical form) to the motive means driving the vehicle and the engine therefor need be operated only on demand.

A further object of the present invention is to provide an apparatus for use on a self-propelled vehicle reclaiming and storing much of the energy typically dissipated and lost as heat in the vehicle's mechanical drive train and braking system.

A still further object of the present invention is to provide an apparatus supplying motive energy for a self-propelled vehicle whereby all energy transfers between subsystems carried on the vehicle are automatically controlled by a digital computer type controller wherein the control functions and modification thereof may be implemented simply by standard software techniques.

Yet another object and feature of the present invention is to provide a vehicle propulsion system which involves energy transfer from one propulsion subsystem to another solely in electrical energy form and which enables the use of separate motor/generator assemblies at several wheels of the vehicle and preferably also a flywheel type energy storage subsystem utilizing plural oppositely rotating flywheels, the synchronization of the flywheels and also the differential operating requirements of the plural drive/driven wheels being readily accommodated by means of a single digital computer type controller wherein the calculations required for flywheel synchronization and drive/driven wheel differential operation are accomplished by pre-programmed software.

Yet another object and feature of the present invention is to provide, in a vehicle propulsion system characterized by transfer of energy in electrical form between the various energy source/storage subsystems and various energy using subsystems, an energy source/storage subsystem of the opposed or oppositely rotating flywheel type wherein the flywheel means has larger energy storage capacity than heretofore possible.

Yet another object and feature of the present invention is to provide a vehicle propulsion system involving digital computer control of energy transfer from one propulsion subsystem to another, which overcomes the limitations characteristic of analog computer type control for the purposes (i.e. hard wired or linear input-output relationships). In contrast the digital computer type system control provided by the present invention, wherein the input and output relationships are of a so-called independent nature with segmented inputting and soft program processing of the input information, makes possible additional and more complicated input and output interrelationships and consequently more efficient operation from the point of view of fuel consumption.

It is a related factor and advantage of the present invention that the digital computer type control utilized in its vehicle propulsion system is readily capable of more positively and efficiently effecting operational control and changes in operational conditions, such as for low speed acceleration or deceleration or direction reversing, simply by appropriate software, which responsiveness to changes in operational control conditions requires complex additional circuitry when analog computer type control is used.

These and other objects, features, and advantages of the present invention will become more apparent in light of the detailed description of the preferred embodiment set forth hereafter, and illustrated in the accompanying drawings.

BRIEF DESCRIPTION OF THE DRAWINGS

FIG. 9 is a diagrammatic showing of the layout of the physical elements of a propulsion system according to the present invention, further illustrating the various electrical connections, control connections, and mechanical linkages involved.

BEST MODE OF CARRYING OUT THE INVENTION

Figure 1:
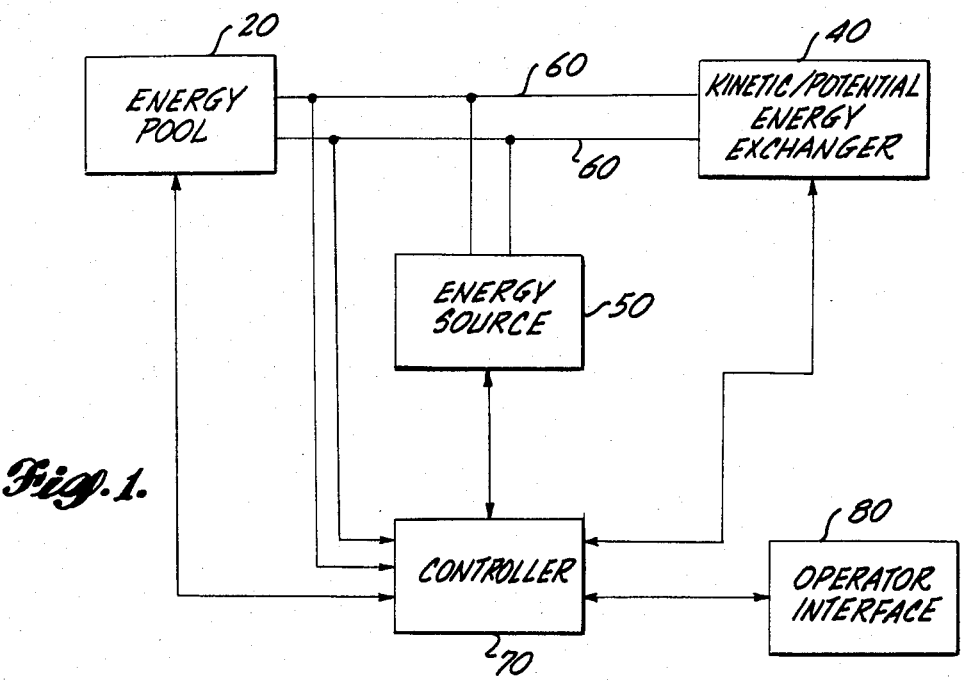
FIG. 1 is a block diagram showing a typical apparatus providing motive energy for a self-propelled vehicle.

With reference to FIG. 1, an apparatus providing motive energy for a self-propelled vehicle according to the present invention generally comprises a first means or subsystem 20 carried by the vehicle for absorbing, storing, and releasing energy. A second or subsystem 40, also carried by the vehicle, is operable to convert the motion of the vehicle into electrical energy, and electrical energy into vehicle motion. The second means is also operable to exchange this converted energy with the energy generated and stored on the vehicle by the first means. A third means or subsystem 50 is operable to supply energy losses occurring in both the first and second means, as well as accessory loads such as lights, radios, and the like. An electrical bus 60 is in switched or controlled communication with the first, second, and third means and permits the multidirectional transfer of energy among these means. The present invention further includes a digital computer type controller means 70 monitoring the bus voltage, the first, second, and third means and operator inputs 80 such as accelerator and brake pedal position, which controller 70 is then operable to control the energy transfer from one of these means to another along the multidirectional bus. Each of these elements, together with the other elements comprising the present invention, are described in more detail below.

Figure 2:
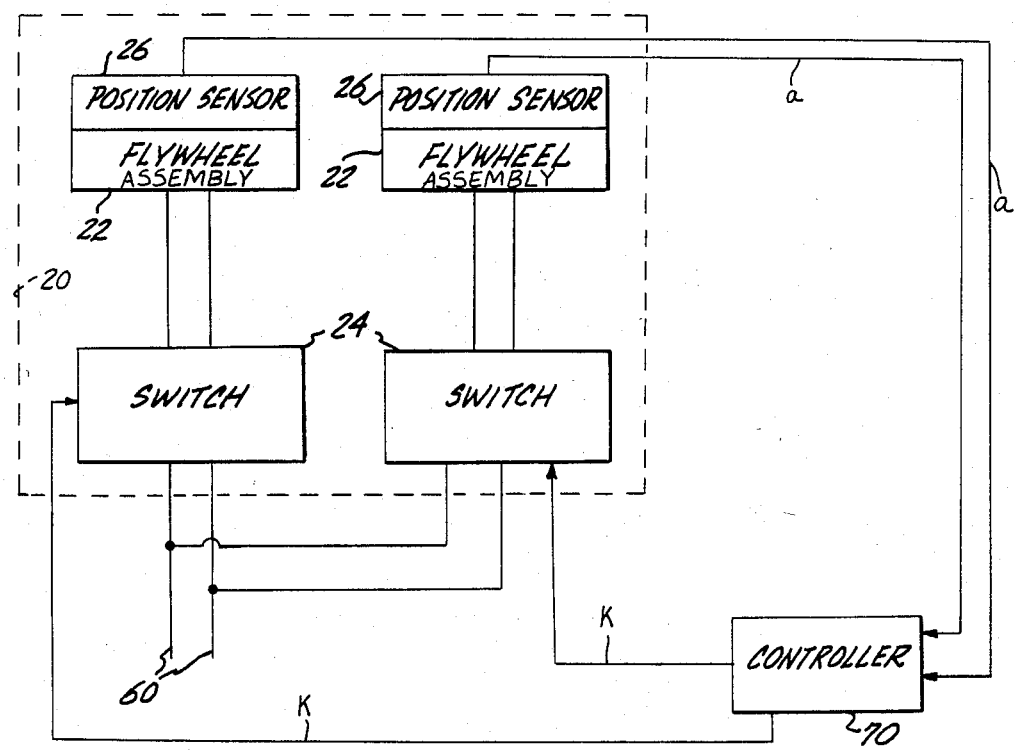
FIG. 2 is a block diagram showing a typical first means according to the present invention for absorbing, storing, and releasing energy.

With reference to FIG. 2, the first means 20 carried by the vehicle for absorbing, storing, and releasing energy can be viewed as an energy pool. In the preferred embodiment, this first means comprises a plurality of oppositely rotating flywheel assemblies 22, each including a driving/driven induction motor/generator and each in switchable communication with the multidirectional bus 60 through switch means 24. Each flywheel assembly 22 is of the electromechanical type having a rotatable member containing a material either permanently magnetized or capable of sustaining a magnetic field and enabling a direct energy transfer between the flywheel and the bus 60 through the switch 24. In the preferred embodiment, one or more pairs of flywheel assemblies are utilized to practice the invention. In each pair, the two flywheels are each aligned to the same axis of rotation as the other and each is made operable to rotate in the opposite direction of the other. In this manner, the flywheel assemblies cumulative precessions in each pair can be made to cancel each other. Considered per se, flywheel assemblies 22 may be of one of the forms discussed in the aforementioned Scientific American article.

As will be described more fully below, the control of the operability and the rate of rotation of the flywheel assemblies and the transfer of energy between the flywheel assemblies and the bus 60 is provided by the digital computer type control means 70.

The flywheel assemblies are in communication with the multidirectional bus through a plurality of switches 24. Each switch is a bidirectional switch enabling the energy on the bus to be transferred to each flywheel, or the energy generated by each flywheel to be transferred to the multidirectional bus. Each flywheel switch means 24 is operably controlled by the digital computer type controller as hereinafter described more fully with respect to the above drive wheel switch means.

Figure 3:
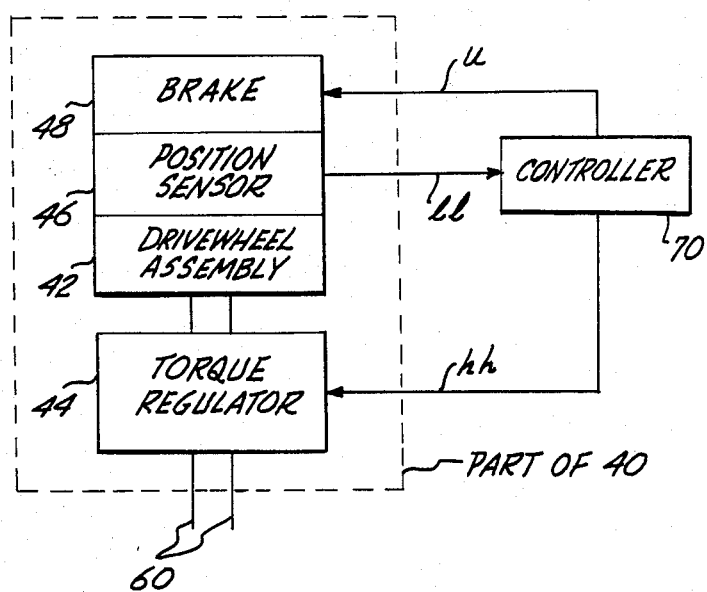
FIG. 3 is a block diagram showing a typical second means according to the present invention for exchanging the vehicle's energy of motion and the stored and/or generated energy.
Figure 4:
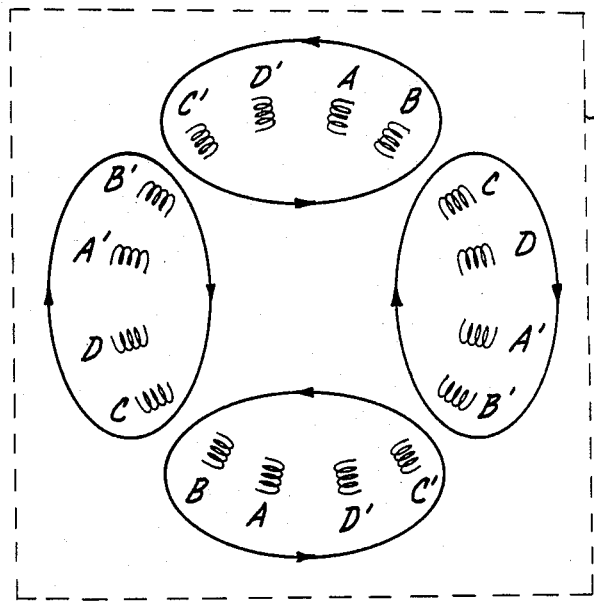
FIG. 4 is a schematic representation of a typical drive wheel motor/generator stator coil arrangement, showing the magnetic paths thereof.
Figure 5:
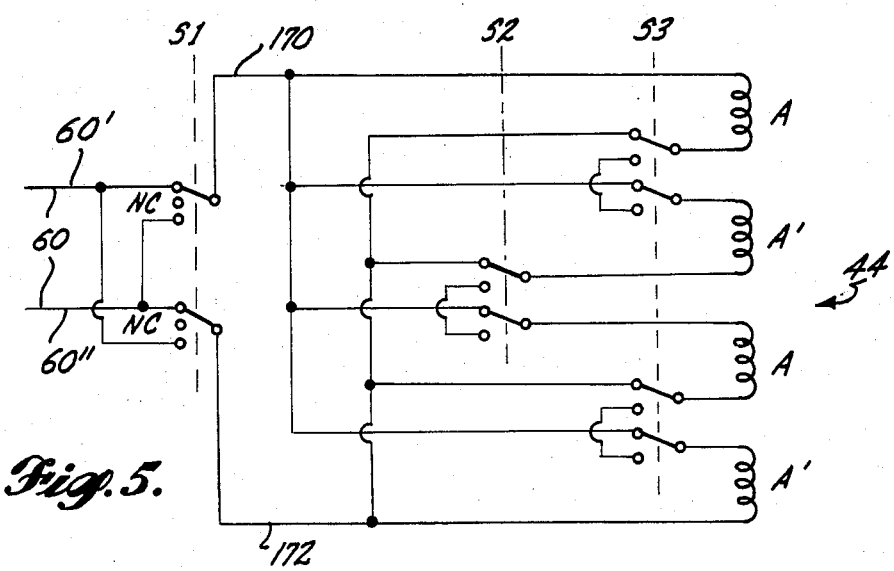
FIG. 5 is an electronic schematic diagram showing a typical drive wheel assembly motor/generator torque regulator means according to the present invention.

With reference to FIGS. 3–5, the second means 40 carried by the vehicle operable to convert the motion of the vehicle into potential energy comprises a plurality of drivewheel assemblies 42 (e.g. two or four, with four being preferred), each including a ground engaging wheel 42A, FIG. 9, of the vehicle with the wheel directly mechanically interconnected at 42B to the associated electric motor/generator 43C. The mechanical interconnection is suitably effected through the use of a direct drive axle or similar means. Each of a plurality of torque regulators 44 is in electrical communication with the stator coils of an associated one of the plurality of drivewheel assembly motor/generators. As discussed below in connection with FIGS. 5 and 5A, each torque regulator 44 is further in communication with the multi-directional bus 60 and is operable to control the voltage, frequency, and duty cycle of the electrical power supply from the bus to the drivewheel assembly motor/-generator, thereby controlling the direction and velocity of rotation of each drivewheel assembly drive wheel. As will be apparent, the motor/generator of each drivewheel assembly is an electromotive device transforming electrical energy to conventional mechanical motion, i.e. ground engaging wheel rotation, or converting ground engaging wheel rotation to electrical energy.

Each drivewheel assembly motor/generator can be viewed as a multi-coiled stator inductive machine with squirrel cage rotor or a multi-coiled stator synchronous machine with permanently magnetized rotor. The rotor is concentrically mounted adjacent to the stator in a manner conventional per se. With reference to FIG., 4, a typical drivewheel assembly motor/generator according to the present invention is diagrammatically shown as comprising a sixteen coil inductive motor. It is to be understood that, although sixteen stator coils 142 are shown, any number of coils divisible by three or more may be utilized in the drivewheel assembly motor/generator without departing from the teachings of the present invention. The depicted sixteen coil motor has four groups of four coils with each group disposed circumferentially around the stator of the motor such that the two coils shown at A, together with two coils shown at A', form one group, and the four coils shown at B and B' form a second group. Similarly, the four coils shown at C and C' form a third group and the four coils shown at D and D' form the fourth group.

The direction of rotation of the drivewheel assembly, and therefore the direction of rotation of the vehicle's ground engaging wheels, is established by using three or more groups of coils. Each group of the four groups of coils has its own switch S1, as shown in FIG. 5 in connection with coil group A and A', for example. The polarity of each coil group may thus be controlled independently of the polarity of the other groups. As will be understood, coils are connected as a four pole magnetic motor/generator, in a manner also conventional per se. As shown in FIG. 4, the eight stator coils marked A,A, B,B, C,C, and D,D, are all wound to have the same polarity, that is, each of these coils present the same magnetic pole to the induction motor/generator rotor. In a similar manner, each of the eight coils designated A',A', B',B', C',C', and D',D', are wound to have the opposite polarity of the other eight coils designated A, B, C, and D.

Figure 5A:
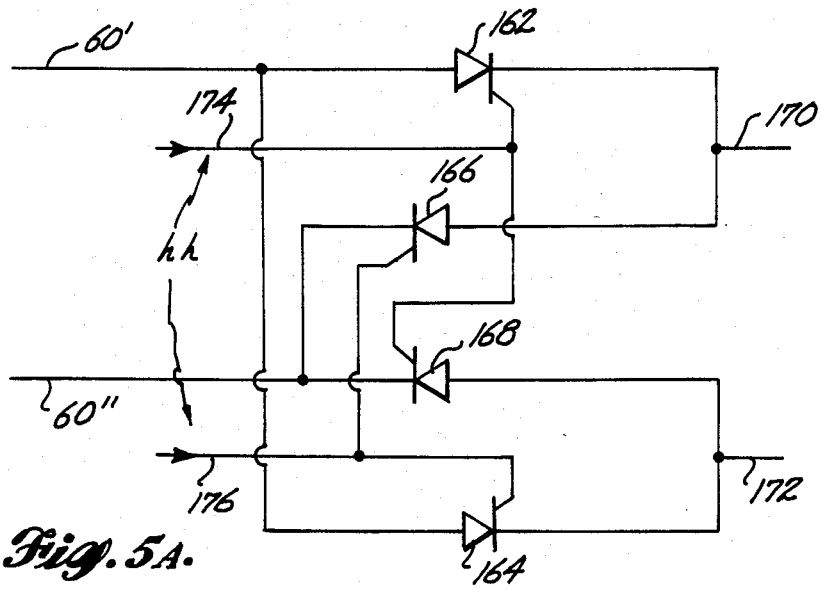
FIG. 5A is a detailed schematic diagram of that portion of FIG. 5 comprising switch means S1.

A double pole, on-off-on switch , as shown at S1 in FIGS. 5 and 5A, enables the controller 70 to provide complete control over the polarity and duty cycle of each group of coils. The double pole on-off-on switch S1 essentially operates as a bidirectional switch, the manner of operation and use of which are discussed more fully below.

In the startup condition during which all drivewheel motor/generator coils are energized, the direction of rotation thereof is established by reversing the polarity of either group A and A' coils, or group D and D' coils (FIG. 4), while keeping the polarity on the remaining groups of coils unchanged. If the polarity of the group A and A' coils is reversed, the resulting displacement of the magnetic field causes the rotor of the drivewheel assembly motor/generator to align itself to a position one-sixteenth of a turn away from its initial position so that the parts of the rotor that were originally adjacent to the coils in group A and A' are now adjacent to the coils in group B and B'. If the polarity of the group D and D' coils is reversed in lieu of reversing the polarity of the group A and A' coils, the rotation. of the drive wheel assembly motor/generator is in the opposite direction to that described. If the coils in group A and A' are first to have their polarity reversed, the direction of rotation of the drivewheel assembly motor/generator is maintained by sequentially reversing the polarity of coil groups B and B', C and C', and D and D', respectively, followed in turn by reversing again the polarity of coil group A and A'. In a similar manner, if the polarity of coil group D and D' is first reversed, the sequence of rotation then becomes coil group C, B, A, then D.

Typical circuitry detail is shown at FIG. 5A of the switch S1 portion of the torque regulator 44 shown in FIG. 5. The positive conductor 60' of bus 60 is connected to the anode of each of thyristors 162, 164 and the negative conductor 60" of bus 60 is connected to the cathode of each of thyristors 166, 168. The respective cathode and anode of thyristors 162 and 166 are connected together and to the top conductor 170 shown in FIG. 5, and the respective anode and cathode of thyristors 168 and 164 are connected together and to the bottom conductor 172 shown in FIG. 5. The gates of thyristors 162 and 168 are connected together and to control input conductor 174 and the gates of thyristors 164 and 166 are also respectively connected together and to control input conductor 176.

The control input signals to switch S1 from the controller 70 and applied to conductors 174, 176, is computer program output step hh (FIG. 8B), the derivation of which is discussed more fully hereinafter in connection with FIGS. 7 and 8B. Functionally, one "throw" of switch S1, i.e. with the switch arms in the up position shown in FIG. 5, is effected by an electrical control signal from controller 70 in the form of short duration positive pulses applied to conductor 174 rendering both thyristors 162 and 168 conductive and the other thyristors 164 and 166 nonconductive, so that the positive bus voltage (conductor 60') is applied to switch conductor 170 and the negative bus voltage (conductor 60") is applied to switch conductor 172, being transmitted through conductive thyristor 168. Conversely, the polarity of the voltage applied to the coils of the drive wheel assembly motor/generator is reversed when positive control signal pulses are applied to conductor 176 with conductor 174 held negative, rendering thyristors 162 and 168 nonconductive and thyristors 164 and 166 conductive, with the relatively positive bus conductor 60' voltage being transmitted to switch conductor 172 through conductive thyristor 164 and with the relatively negative bus conductor 60" voltage being transmitted through conductive thyristor 166 to switch conductor 170. This is the S1 switch condition which occurs when the S1 switch arms schematically shown in FIG., 5 are in their lowermost switch position. As will be understood, the open or no connection condition, with the S1 switch arms in their middle position in FIG. 5, occurs when the thyristors 162, 164, 166, 168 are in the turned-off or non-conductive condition, which condition is effected when conductors 174 and 176 are both negative. Also, the switch S1 output conductors 170 and 172 are connected in one way or another through switches S2 and S3 to the associated motor/generator stator coils (FIG. 4) and are accordingly at respective opposite polarity at any given time. Whenever the motor/generator rotor induces a change in polarity in the stator coils connected across the conductors 170, 172, the induced opposite e.m.f. reflected back to the respective associated conductive pair of thyristors, if conducting, will cause the thyristors to turn off by natural commutation. For a further discussion of the operation of this type of switch circuit, reference may be had, for example, to the text "Power Electronics" by Raymond Ramshaw, published by Chapman & Hall Ltd., London, Copyright 1973, at Section 2.3.3 and specifically subsection 2.3.3(b) as to thyristor gate turn-on, and Section 2.4.1 and specifically subsection 2.4.1(a) as to thyristor turn-off by natural commutation.

Thyristors suitable for use in switch S1, having a power rating of seventy amps, are Westinghouse Electric Thyristor 2N4365, Motorola Thyristor MCR65-9, and Int'l Rectifier Thyristor 71RA80, for example.

The thyristor type switch S1 switching circuit shown in FIG. 5A is also suitable for use as the flywheel switch means 24, with thyristors of higher power rating, it being understood in this regard that the control signals input to the circuit serving as a switch means 24 is in the form of positive pulses from the controller 70 (process step k, FIG. 8A), applied to one or the other of conductors 174, 176, and the switch conductors 170, 172 are connected across the associated flywheel motor/generator stator coils.

The purpose of the torque regulators 44 is to provide various levels of power transfer from the bus 60 to the respective drive wheel assembly motor/generators, depending on the condition of vehicle operation. As is known, for example, induction motor/generators characteristically do not provide any counter-emf when nonrotating and therefore draw large currents when rotation is initiated. Characteristically, also, relatively low power is needed during the initiation of vehicle movement. The switching arrangement in the torque regulators 44, as shown at FIG. 5 with respect to a given stator coil group A,A and A',A', for example provides, through various conditions of switches S1, S2 and S3, various levels of power transfer from the bus 60 to the respective coils of the group. Thus, a typical and usual start-up condition is with switch S1 connected to the bus 60, with switches S2 and S3 switched to their down positions, as viewed in FIG. 5, with the result that each of the coils A,A and A',A', is connected in series across the bus 60 and are at one-quarter of the bus voltage. Then, as a median rotational speed is reached by the drive wheel assembly motor/generators and counter-emf has developed, a running condition involving medium power transfer can be established by shifting the connection of switch S2, which has the effect of bringing the voltage across each of the coils to one-half the voltage of the bus 60. Should a running condition involving a higher power level be needed, the coils can be brought to the same voltage as the voltage across bus 60 by establishing or maintaining bus switches S2 and S3 in their positions shown in FIG. 5. Switches S2 and S3 may be in the form of relay contacts of appropriate power rating.

Under some running conditions, as at constant vehicle speed, the power demand for drive wheel assembly drive can be quite small, and in such an instance the drive wheel assembly motor/generators can be put in a more or less "idle" state by some of the switches S1 being maintained in their center, or open position. As will be understood, a further controlling factor and possibly the primary one affecting the extent of dynamic power transfer to and from the bus and the drive wheel assembly motor/generators is the duty cycle and phase relationship between the induced magnetomotive force (mmf) and the magnetomotive force generated by the current through the coils as controlled by the switch S1.

The start-up condition, at first turn-on, may find the drive wheel assembly motor/generators non-rotating, with no residual magnetic field. If necessary, the magnetic field may be established or augmented in the motor/generators at first start-up by momentarily applying a DC voltage across the motor/generator stator coils (as at switch conductors 170, 172) from a suitable source (bus 60) in a manner known per se, such as by means of a normally off, momentarily on, one-shot relay actuated by an output pulse from controller 70 when the vehicle-in-use switch is turned on, as sensed by switch position sensor 81.

With further reference to FIG. 1, the third means 50 carried by the vehicle operable to supply energy losses to both the first means (e.g. flywheels), and second means (e.g. drive wheel assemblies), generally comprises a fuel consuming heat engine driven d.c. generator (or a.c. generator or alternator with rectifier). This energy source 50, so designated in FIG. 1, is typically a diesel or gasoline engine and mechanically driven generator. When the controller 70 determines from vehicle speed (the available kinetic energy) and flywheel speed (the available potential energy) that the total energy available to the system is less than a predetermined value, the controller 70 renders the engine driven generator energy source 50 operational to supply make-up energy to the system bus 60 in the form of electrical energy.

The present invention employs a digital computer type controller 70 to monitor and control the first, second and third means, e.g. the flywheel speeds, the drive wheel motor/generators speeds and the fuel engine operation. In addition, the controller 70 further monitors the electrical potential difference on the multidirectional bus to determine whether additional energy is needed from the first means (bus voltage too low) or surplus energy needs to be transferred to the first means or the brake (bus voltage too high).

Figure 6:
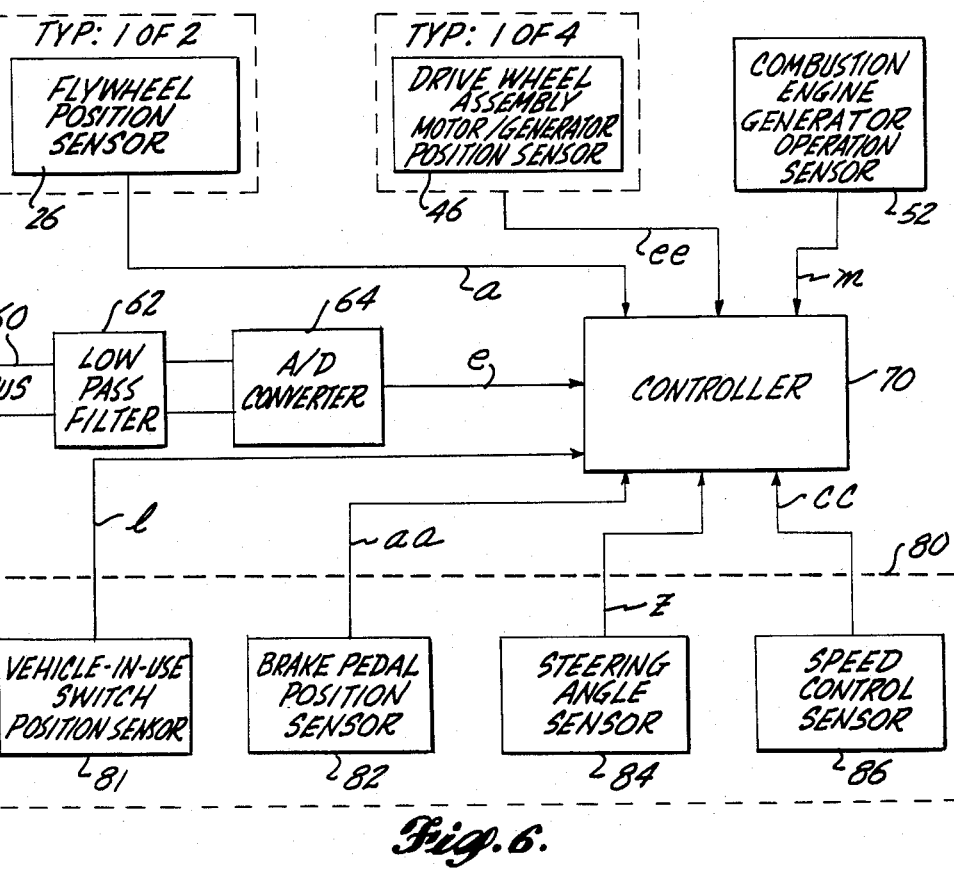
FIG. 6 is a diagrammatic showing of the digital computer type system controller of the present invention and the various operator and operating condition inputs thereto.

The controller 70 is characteristically a programmable microprocessor, with program and program memory, with data memory, and a real time, constant frequency clock counter, commonly called a timer. Also, the controller 70 includes digital receivers for the encoded sensor inputs and digital transmitters for transmitting the encoded control outputs, in a manner conventional per se. As shown at FIGS. 1 and 6, the controller 70 receives operator input signals from the operator or driver of the vehicle as to the desired speed and direction of motion of the vehicle. This operator or driver interface, generally indicated at 80, includes digitized inputs from a brake position sensor 82, a vehicle wheel steering angle sensor 84, and a speed control sensor 86. In addition to these operator command inputs to the controller 70, the controller 70 receives various digitized inputs indicative of the operating condition of the vehicle drive system components. In this respect, each flywheel 22 includes a position sensor 26 (also shown at FIG. 2), and each drive wheel assembly motor/generator 44 includes a high resolution position sensor 46. The controller 70 also receives a digitized input indicative of the combustion engine and d.c. generator operational status from its condition sensor 52.

Figure 7:
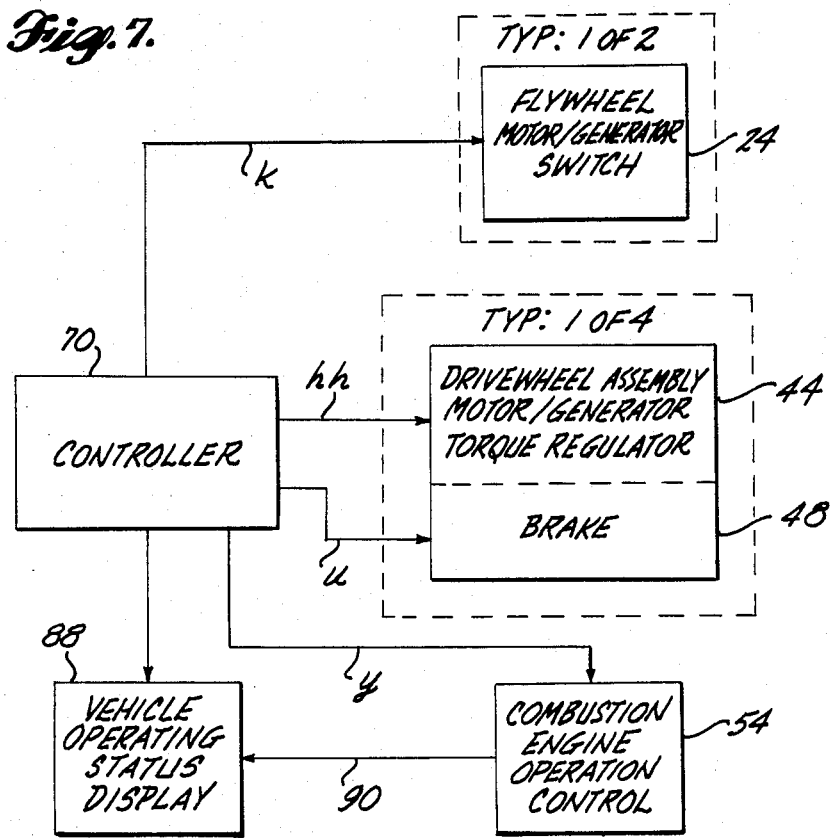
FIG. 7 is a diagrammatic showing of the system controller and the operating condition controlling outputs and condition status display output therefrom.

FIG. 7 diagrammatically shows the control and display outputs from controller 70 which, as will be understood, are in digital form in a manner conventional per se. These outputs comprise outputs (program output step k) to the flywheel motor/generator input/output switches 24, outputs (program output step hh) to the switches S1, S2 and S3 in drive wheel assembly motor generator torque regulators 44, and an output (program output step u) to the brake means 48. In addition, the operational condition of the fuel engine and its driven alternator receives a control output (program output step y) from controller 70 to its operation control means 54 which, as will also be understood, includes the conventional engine starting and stopping components. To provide the vehicle operator or driver with a continuing display of the vehicle operating condition, the controller 70 also generates appropriate outputs to a vehicle operating status display 88 which may include such indicators as vehicle speed, total energy level, engine operating conditions, etc. In addition, the conventional engine operating parameters such as oil pressure and the like may be inputted directly from the combustion engine to the operating status display, as indicated in FIG. 7 at 90.

The operation of the controller 70 and the various system components according to the present invention are next described for three operating situations. In the first given situation, the vehicle speed exactly matches the speed desired by the vehicle operator as reflected by the position of speed control sensor 86. In the second situation, the vehicle's speed is slower than that desired by the vehicle operator, and in the third situation to be considered the vehicle speed is faster than that desired by the vehicle operator. In each of the latter two situations, for simplicity, the multidirectional bus 60 is assumed to be connected to an infinite current source and drain, and losses in the flywheel motor/generators, the drive wheel assembly motor/generators, and the combustion engine driven generator are assumed to be zero in all three situations. For purposes of illustration, the direction of movement of the vehicle is assumed to be straight ahead, so that the nondirectional aspects of the vehicle's motion may be described.

In the first situation (with the actual speed exactly matching the desired speed), the controller 70 continuously outputs switching control pulses to all switches S1 of the torque regulators 44. The control pulse frequency is such that the mmf generated by the drivewheel assembly motor/generator coils 142 (FIG. 4) is kept in phase with the induced mmf of the motor/generator rotor, keeping the inductive slip at or near zero. The duty cycle of each group of stator coils in each drivewheel assembly motor/generator is minimized and under this ideal, no loss condition there is essentially no transfer of energy between bus 60 and any of the devices connected to it.

In the situation where the vehicle velocity is less than that desired by the vehicle operator, the frequency of switching of switches S1 is increased at a rate calculated to keep the inductive slip of the drivewheel motor/generator within an acceptable limit of heat losses. The duty cycle is increased to permit more energy transfer from the bus 60 to the drivewheel assembly motor/generators. If inductive slippage is too great when the duty cycle has been maximized (as determined from a comparison of the actual instantaneous velocity with the calculated instantaneous velocity, program process step gg), the switching speed is reduced until the inductive slippage is again within an acceptable tolerance.

When the vehicle is traveling faster than desired by the vehicle operator, the switching frequency of switches S1 is reduced at a predetermined rate. If the magnitude of the inductive slippage becomes too large, the duty cycle is increased to allow more energy to be transferred from each drivewheel assembly motor/generator to the multidirectional bus 60. If this does not reduce the slippage sufficiently, the rate of slowing of the switching frequency may be decreased or, in the case of a fully charged energy pool 20, mechanical brakes 48 may be applied to slow the vehicle or remove excess energy from the system.

A typical operational sequence for the controller 70 is next described with reference to FIGS. 8A and 8B, which is a flow chart of a typical computer program for the controller digital computer. The first function or program process input "a" (FIG. 8A and also FIG. 6) is derived by reading the contents of a conventional digital storage device such as a timer in which fixed interval high frequency timing pulses are accumulated. The value of the input "a" is represented by the number of timing pulses generated during the time interval bounded by the previous two pulses emitted by each flywheel position sensor 26 (FIG. 6) fixed to each flywheel rotor, and is therefore directly proportional to the duration of said time interval. In a like manner, each function or program process input "ee" (FIG. 8B) is derived from the associated drivewheel assembly motor/generator position sensor 46.

Figure 8A:
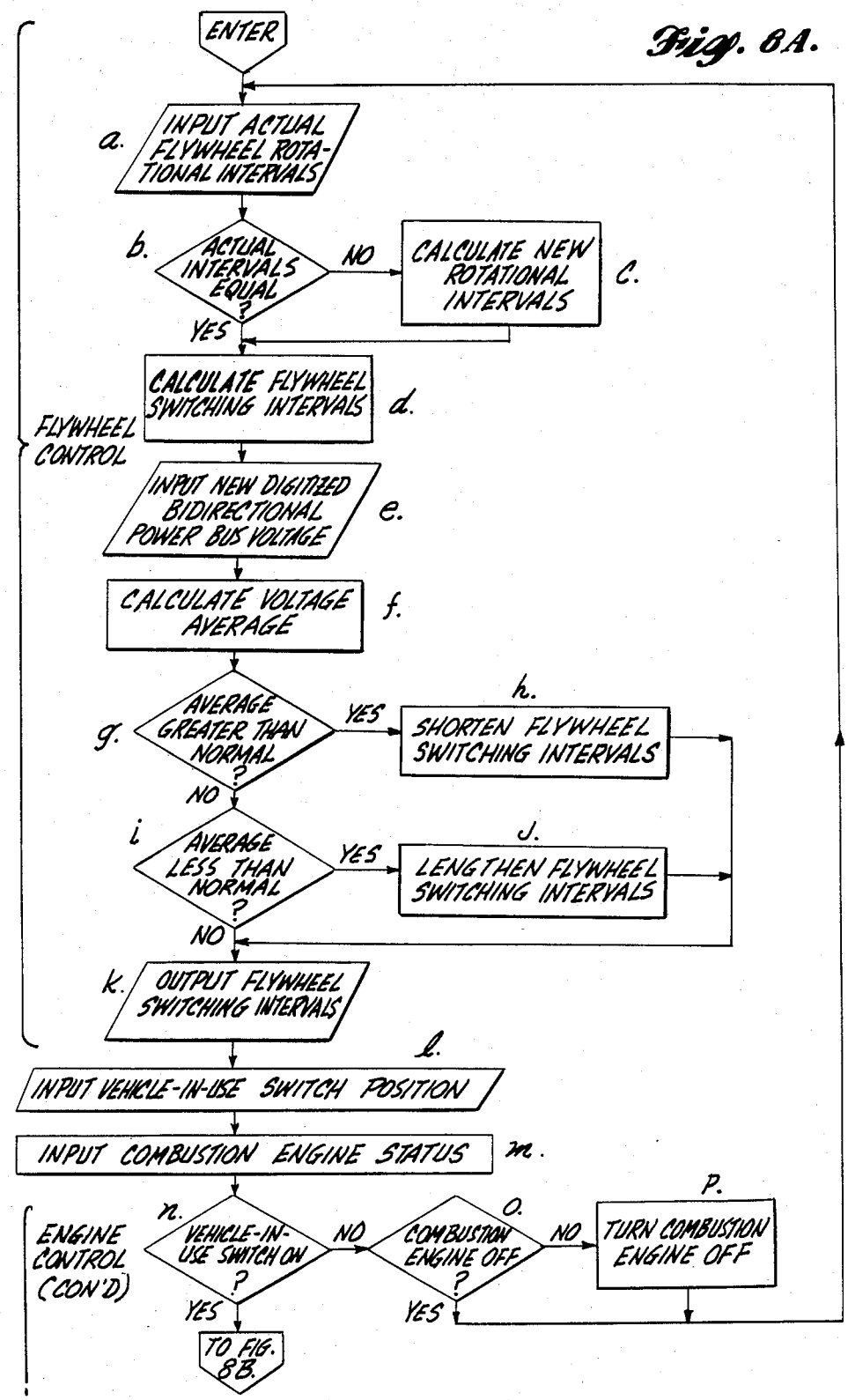
FIG. 8A and 8B collectively present a program flow chart showing a typical and simplified sequential operation of system controller means programmed according to the present invention.
Figure 8B:
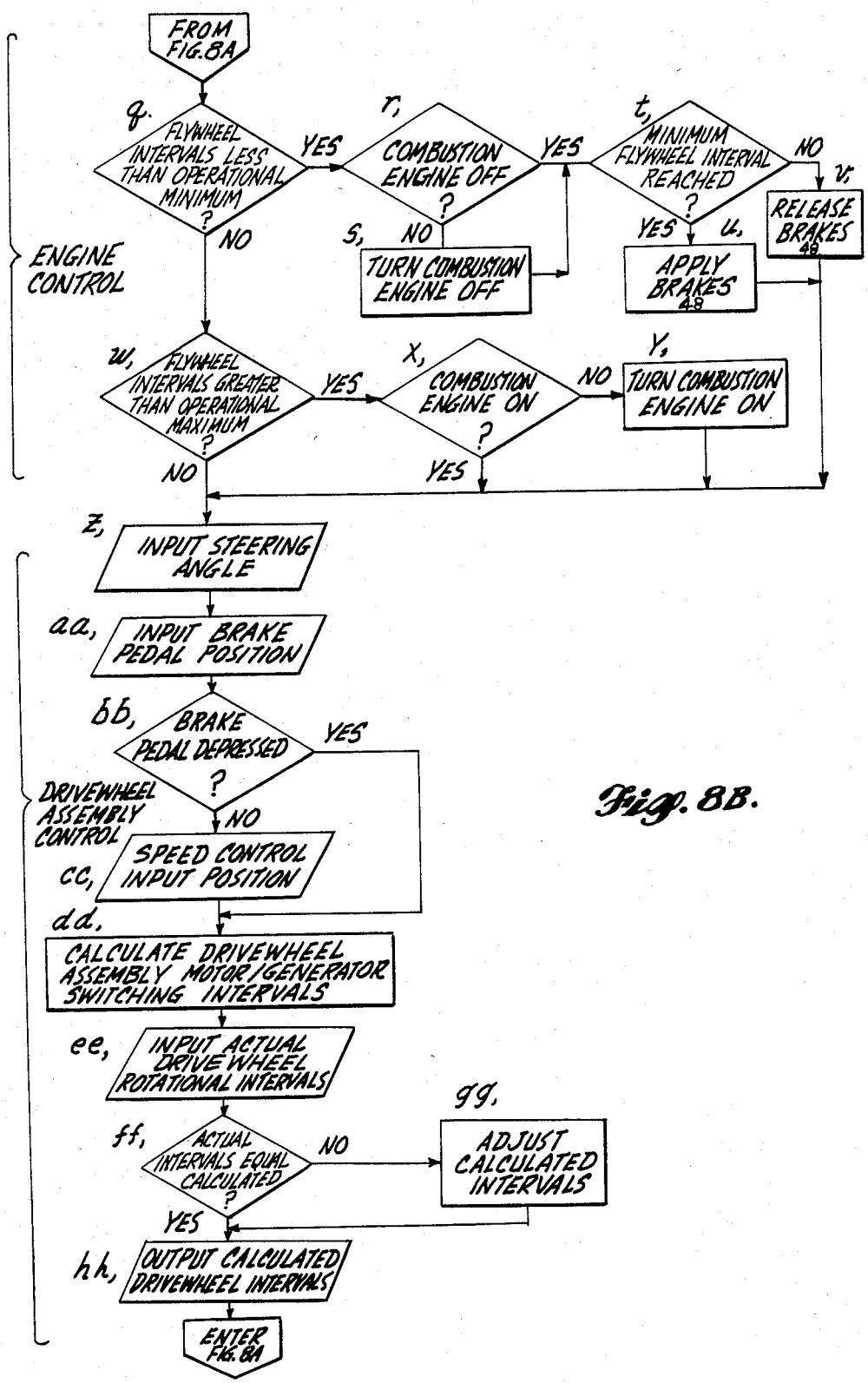

Process step "b" of FIG. 8A, compares the two flywheel previous time interval durations for each flywheel 22. If these intervals are within a specified tolerance of each other (e.g. ±1%), process step "c" is bypassed, the assumption being that their counterrotational velocities are adequately equal. If the flywheel rotational intervals differ by more than the predetermined tolerance, process step "c" operates to reduce the difference, as by swapping the two values for the next calculation in process step "d" described below.

In FIG. 8A, process step "d" scales the values calculated in process step "c" or measured in process input "a" to compensate for any difference in the number of flywheel stator coils and the number of encoded positions in the flywheel rotational position sensor 26.

In process step "e" the average bus voltage is realized as a program process input by converting the analog voltage output of a low pass filter 62 connected to the multi-directional bus 60, to a digital value by means of a conventional analog-to-digital converter 64.

Process step "f" averages the digital value of the process input "e" with enough previous successive like bus voltage values to eliminate any high frequency fluctuations in the bus voltage which may not have been eliminated by the low pass filter 62.

Process steps "g" and "i" compare the averaged digital voltage determined in step "f" with a predetermined target or desired value of bus voltage, e.g. 200 volts DC or more. If the actual bus voltage is within a predetermined tolerance (e.g. ±5%), process steps "h" and "j" are bypassed; if the actual bus voltage is too high, the flywheel switching intervals calculated in step "d" are shortened to increase the flywheel velocities. This causes a transfer of energy to the flywheels from the bus 60 and results in a decreased voltage on the bus. If the average bus voltage is too low, said flywheel switching intervals are lengthened, causing a transfer of energy from the flywheels to the bus and raising the voltage thereon.

Process output "k" (also note FIG. 7) is developed by writing the aforementioned flywheel switching intervals into a memory used to hold them until the end of the then operational switching interval. The stored intervals are then each copied into a timer which times the next switching interval, as by decrementing the value by 1 for each of the timing pulses obtained in step "a", until the value reaches zero, marking the end of that switching interval and the beginning of the next.

The operational status of the vehicle is inputted at process step "1" from a vehicle-in-use switch position sensor 81 and engine driven generator operation sensor 52 provides processing input "m" indicative of the engine operational status. If the vehicle is not in use, (the vehicle-in-use switch is off, sensed by sensor 81) all that needs to be done is to make certain the engine is not operating (functions "n" and "o") and the flywheels speeds are maintained equal (steps "a" through "k", inclusive). If the vehicle-in-use switch is on, steps "o" and "p" are skipped. If the flywheel speeds should exceed a predetermined safe limit, function "u" (application of mechanical drive wheel brakes 48) will occur.

Process steps "q" and "w" check to see if the flywheel intervals measured in step "a" are within normal operational limits. If the flywheels are spinning too fast (timing intervals too short) the engine is turned off if on (steps "r" and "s"), and a check is made (step "t") to see if the flywheel velocities are within the safe operating range. If not, brakes 48 are applied to absorb energy from the system and reduce the flywheel velocities. If the flywheels are spinning slower than normal operational limits (timing intervals too long) the engine is turned on if it isn't already on (steps "x" and "y"). If the flywheel speeds are within normal operating range, functions "r", "s", "t", "u", "v", "x", and "y" are skipped.

Process input "z", steering angle, is suitably obtained, as by reading the digitized angular position of a conventional optical encoding device attached to the steering linkage.

If the brake pedal is depressed, the position of the pedal is sensed by sensor 82 and inputted as process step "aa". This input may be obtained by means of any of various position encoding devices, in a manner known per se. When the brake pedal is not depressed, the position of the speed control pedal or the like is read in like manner by sensor 86 and inputted as process step "cc".

The drivewheel assembly motor/generator switch S1 switching intervals (process step "dd") are first calculated as a function of speed control or brake pedal positions, steering angle and previously calculated switch S1 switching intervals. The steering angle input (process step "z") is used to calculate the different velocities of each wheel based on the physical placement of the wheels on the vehicle. One acceptable method of doing this is to have a so-called lookup table in permanent memory, made up of the normalizing factors for various steering angles for each wheel and interpolating for in between angles. The best approach in this respect depends upon the geometry of the vehicle, but whatever scheme is used should result in a factor for each wheel that is proportional to vehicle turning radius. As will be understood, since the drive wheels are directly driven by the associated motor/generators and are compensated as to respective turning radius, the drive wheels have positive traction at all times.

If the brake pedal is not depressed (process step "bb"), the position of the speed control means (process input "cc") is used to figure an acceleration or deceleration factor. A fully depressed speed control pedal, for example, corresponds to maximum allowable acceleration and a fully released speed control pedal decelerates the vehicle at the same rate. The maximum allowable acceleration would be a function of rated continuous drivewheel assembly motor/generator coil current and therefore varies with vehicle velocity. A suitable procedure for determining this value for a given velocity is to have a further lookup table, in permanent memory, relating coil current and acceleration rates to various velocities. In this tabulation each position of the speed control pedal would correspond to a particular steady state vehicular velocity. If the speed control pedal position matches the velocity of the vehicle (comparison process step "ff"), there is no accelertion or deceleration, the acceleration/deceleration factor is then 1, and process steps "gg" is bypassed. If the position of the speed control pedal is different, the drivewheel motor/generator switching intervals are adjusted accordingly (process steps "gg" and "hh"). The ratio of this difference to the maximum difference (i.e., fully depressed or fully released pedal) is then used to determine the fractional acceleration or deceleration rate, thus giving the operator precise control of vehicular velocity change. If the brake pedal is depressed, the range of deceleration rate available through means of the brake pedal would be from a condition of minimal deceleration with the speed control pedal fully released and the brake pedal also fully released, to a condition of maximal deceleration with the brake pedal fully depressed with one or more tires starting to slide on the road surface. As a safety feature, if the motor/generator coils start to overheat, the brake means can also be applied automatically.

As earlier indicated, when the velocity of the vehicle is high and steady, some of the coil groups can be cut out and the duty cycle shortened.

FIG. 9 is a diagrammatic view of the layout of the physical elements of a propulsion system according to the present invention, in general showing electrical connections in solid line, computer controller control output connections in broken line, and mechanical linkages in double solid line. As shown in FIG. 9, each flywheel assembly 22 comprises a flywheel 22A which is connected by mechanical linkage 22B to a driving/driven induction motor/generator 22C, and each drive wheel assembly 42 comprises a drive wheel 42A connected by mechanical linkage 42B to a driving/driven induction motor/generator 42C. Similarly, energy source 50 comprises fuel engine 50A connected by mechanical linkage 50B to DC generator 50C. The DC bus 60 interconnects the generator 50C, the flywheel assembly control switches 24, and the drive wheel assembly torque regulations 44. Computer controller 70 generates control outputs k to the flywheel motor/generator control switches 24, outputs h to the drive wheel assembly motor/generator torque regulators 44, and control output y to the fuel engine 50A (such controller outputs being also shown at FIG. 7).

What is claimed is:

1. A vehicle propulsion system having a fuel consuming heat engine and a plurality of ground-engaging drive wheels, each such drive wheel being directly and separately driven by an induction motor/generator, and means supplying alternating current electrical energy to the motor/generators to meet the energy needs of the drive wheels, such electrical energy supply means including flywheel driven induction motor/generator means and, as needed, DC generator means driven by said fuel consuming heat engine, with only energy contribution of such heat engine to the system being the electrical output of the DC generator means driven by the heat engine, transmitted through a DC bus and bi-directional, computer controlled switch means to said induction motor/generators.

2. An electrical energy interchange system for wheeled vehicle propulsion, comprising induction motor/generator driven/driving drive wheels, induction motor/generator driven/driving flywheel means, and fuel engine driven DC generator means, and system including:
   (a) a plurality of flywheels each drives by a separate induction motor/generator;
   (b) a plurality of drive wheels each directly and separately driven by a separate induction motor/generator;
   (c) an electrical bus maintained at a DC voltage which is responsive to the operational conditions and the operational needs of the vehicle;
   (d) bidirectional, variable frequency switching means between each of the induction motor/generators and the bus; and
   (e) digital computer type controller means monitoring the DC voltage on the electrical bus and, responsive thereto, controlling the frequency and duty cycle of each of said switching means, and controlling the operation of said fuel engine driven DC generator means to deliver electrical energy to said DC bus as needed.

3. A system according to claim 2, including two oppositely rotating flywheels.

4. A system according to claim 2, including four drive wheels.

5. A system according to claim 2, wherein the voltage on the electrical bus is maintained at at least 200 volts DC.

6. An apparatus for providing motive energy for a self-propelled vehicle, comprising:
   (a) electrical bus means;
   (b) a plurality of oppositely rotating, flywheel driving/driven induction motor/generators each connectible by variable frequency switch means to said bus;
   (c) a plurality of vehicle drive wheel driving/driven induction motor/generators operable to convert electrical energy into motion of the vehicle and motion of the vehicle into electrical energy and each connectible by variable frequency switch means to said bus;
   (d) heat engine driven electrical energy generator means operable to supply electrical energy losses in the motor/generators, and including switch means for connecting said generator means to said bus on demand; and
   (e) digital computer type controller means monitoring vehicle component operation and operational demands, and controlling said switch means to cause electrical energy interchange through the said switch means and to and from the electrical bus so that the voltage on the bus is maintained substantially at a predetermined level, with excess energy being stored as kinetic energy in the flywheels and with the total energy available from the motion of the vehicle and the kinetic energy of the flywheels being made up by operation of said heat engine driven electrical generator means whenever the total energy available from motion of the vehicle and the kinetic energy of the flywheels is less than a predetermined value.

7. The apparatus of claim 6, comprising means sensing bus voltage and providing an input thereof to said controller means, the said controller means in turn providing an output causing said variable frequency switching means to drive the flywheel motor/generators to accelerate the flywheels whenever the bus voltage exceeds a predetermined value and causing the flywheel motor/generators to decelerate the flywheels and deliver a portion of the kinetic energy thereof to the bus in the form of electrical energy whenever the bus voltage is less than a predetermined value.

8. The apparatus of claim 6 or claim 7, further comprising flywheel position sensing means and an input thereof to said controller means, the said controller means in turn providing an output to the flywheel motor/ generator switching means maintaining said flywheels at substantially equal rotational speeds.

9. The apparatus according to claim 7, wherein said apparatus further comprises vehicle component position and operation sensors of flywheel, drive wheel, vehicular brake, steering angle, and speed control positions, bus voltage, and heat engine driven generator means operating condition, the said controller means receiving as inputs the various component position and operator sensor outputs, and the said controller means calculating and providing outputs to control the various switch means to respond to the operational demands indicated by the speed control and steering angle sensors and operational needs of the various motor/generators, and also operating the heat engine and electrical energy generator means driven thereby only when required to maintain the total energy available from the motion of the vehicle and the kinetic energy of the flywheels at a predetermined value.

10. An apparatus according to claim 7, including two oppositely rotating flywheels.

11. An apparatus according to claim 6 or 9, including four drive wheels.

12. An apparatus according to claim 6, wherein the voltage on the electrical bus is maintained at at least 200 volts DC.

13. A vehicular propulsion system comprising:
   (1) kinetic energy source/storage means comprising oppositely rotating flywheel assemblies each including a driving/driven induction motor/generator;
   (2) a plurality of vehicle drive wheel assemblies each including a ground engaging drive wheel directly driving/driven by an induction motor/generator;
   (3) a fuel consuming energy source including a heat engine and an electrical energy generator means driven thereby;
   (4) electrical bus means;
   (5) torque regulators including bidirectional, variable frequency switch means each interconnecting each of the flywheel assembly motor/generators with said bus means;
   (6) bidirectional, variable frequency switch means each interconnecting each of the drive wheel assembly motor/generators with said bus means;

(7) switch means interconnecting the heat engine driven generator means with said bus means;

(8) vehicle component position and operation sensors sensing flywheel and drive wheel positions, vehicular brake, steering angle, and speed control positions, bus voltage, and heat engine driven generator operating condition;

(9) controller means including a digital computer receiving as inputs the various component position and operation sensor outputs and providing outputs to control the various switch means so that the following vehicular operating conditions occur:

(a) the drive wheel motor/generators are individually conductively connected to the bus, in a manner to receive electrical energy therefrom when the respective drive wheel is to be driven and to deliver electrical energy thereto when the vehicle is decelerating, (b) the flywheel motor/generators are each conductively connected to the bus in a manner to accelerate the associated flywheel when the bus voltage exceeds a predetermined value and are each conductively connected to the bus in a manner to decelerate the associated flywheel and deliver a portion of its kinetic energy to the bus when the bus voltage is below a predetermined value, (c) the flywheels are maintained at substantially equal rotational speeds, and (d) the heat engine is operated and the generator driven thereby is conductively connected to the bus in a manner to deliver heat engine kinetic energy thereto in the form of electrical energy when the total energy available from the motion of the vehicle and the kinetic energy of the flywheels is below a predetermined value, and to disconnect the generator from the bus and stop the operation of the heat engine when such total energy exceeds a predetermined value.

14. A system according to claim 13, comprising two flywheel assemblies and four drive wheel assemblies.

15. A system according to claim 13 or claim 14, wherein the normal operating condition of the system is with the voltage on the electrical bus means at at least 200 volts DC.

16. A vehicle propulsion system or the like characterized by energy interchange between a plurality of flywheel assemblies each including a driving/driven induction motor/generator, and a plurality of vehicle drive wheel assemblies including drive wheels each directly driving/driven by an induction motor/generator, with energy makeup being provided by a heat engine driven generator means, operated on demand, such energy interchange being by means of a multi-directional bus at a DC voltage, to which bus the flywheel and drive wheel motor/generators are selectively connected by variable frequency switch means and to which the engine driven generator means is connected when operating, such switching being under control of a digital computer type controller and means inputting to the controller various vehicle operating conditions including flywheel, drive wheel, brake, steering angle and speed control positions, and bus voltage and heat engine driven generator operating condition, the said controller producing outputs controlling the said switch means to transfer energy from or to the bus and to or from the drive wheel motor/generators to accelerate or decelerate the vehicle, and to transfer energy from or to the bus and to or from the flywheel motor/generators when the bus voltage is less than or greater than a predetermined value, and the said controller generating a further output causing the heat engine to operate and energy transfer from the engine driven generator means to the bus whenever the total energy available from the motion of the vehicle and from the kinetic energy of the flywheels is less than a predetermined value.

17. A vehicle propulsion system or the like characterized by energy interchange between a flywheel assembly including a driving/driven induction motor/generator, and a vehicle drive wheel assembly including a drive wheel directly driving/driven by an induction motor/generator, with energy makeup being provided by a heat engine driven DC generator, operated on demand, such energy interchange being by means of a multi-directional bus at a DC voltage, to which bus the flywheel and drive wheel motor/generators are selectively connected by variable frequency switch means and to which the engine driven DC generator is connected when operating, such switching being under control of a digital computer type controller and means inputting to the controller various vehicle operating conditions including flywheel, drive wheel, brake, and speed control positions, and bus voltage and heat engine driven DC generator operating conditions, the said controller producing outputs controlling the said switch means to transfer energy from or to the bus and to or from the drive wheel motor/generators to accelerate or decelerate the vehicle, and to transfer energy from or to the bus and to or from the flywheel motor/generator when the bus voltage is less than or greater than a predetermined value, and the said controller generating a further output causing the heat engine to operate and energy transfer from the engine driven DC generator to the bus whenever the total energy available from the motion of the vehicle and from the kinetic energy of the flywheel assembly is less than a predetermined value.

* * * * *